(12) United States Patent
Vetere, II et al.

(10) Patent No.: US 11,679,696 B2
(45) Date of Patent: Jun. 20, 2023

(54) SWIVEL MECHANISM FOR ROTATION OF A SEAT IN AN AUTOMOTIVE VEHICLE

(71) Applicant: Magna Seating Inc., Aurora (CA)

(72) Inventors: Louis Vetere, II, Commerce Township, MI (US); Detjon Marini, White Lake, MI (US); Michael D Nacy, Lake Orion, MI (US); Kai Zhao, Rochester Hills, MI (US); Cheikh Dioum, Farmington Hills, MI (US); Omar D Tame, West Bloomfield, MI (US)

(73) Assignee: Magna Seating Inc, Aurora (CA)

( * ) Notice: Subject to any disclaimer, the term of this patent is extended or adjusted under 35 U.S.C. 154(b) by 211 days.

(21) Appl. No.: 17/292,575

(22) PCT Filed: Nov. 7, 2019

(86) PCT No.: PCT/US2019/060189
§ 371 (c)(1),
(2) Date: May 10, 2021

(87) PCT Pub. No.: WO2020/097281
PCT Pub. Date: May 14, 2020

(65) Prior Publication Data
US 2021/0394648 A1    Dec. 23, 2021

Related U.S. Application Data

(60) Provisional application No. 62/818,779, filed on Mar. 15, 2019, provisional application No. 62/757,801, filed on Nov. 9, 2018.

(51) Int. Cl.
*B60N 2/14*    (2006.01)

(52) U.S. Cl.
CPC .................................. *B60N 2/146* (2013.01)

(58) Field of Classification Search
CPC ................................ B60N 2/146; B60N 2/14
See application file for complete search history.

(56) References Cited

U.S. PATENT DOCUMENTS

| 3,572,817 A | 3/1971 | Colautti et al. |
| 4,792,188 A | 12/1988 | Kawashima |

(Continued)

FOREIGN PATENT DOCUMENTS

| EP | 2896534 A1 * | 7/2015 | ............. B60N 2/005 |
| EP | 3219617 A1 * | 9/2017 | ............... B60N 2/06 |

(Continued)

*Primary Examiner* — Milton Nelson, Jr.
(74) *Attorney, Agent, or Firm* — Miller Canfield

(57) ABSTRACT

A seat assembly includes a swivel mechanism for providing rotation of the seat assembly in an automotive vehicle. The swivel mechanism includes a first plate assembly coupled to a second plate assembly at a rolling-element bearing to facilitate axial rotation of one of the first and second plate assemblies relative to the other of the first and second plate assemblies. A lock plate slidably disposed on the second plate assembly selectively engages a lock pin extending from the first plate assembly for movement between a locked position in which the swivel mechanism cannot rotate and an unlocked position in which the swivel mechanism can freely rotate. Actuation of the lock plate between the locked position and the unlocked position actuates movement of a wedge between a cinched position to stabilize the swivel mechanism and an uncinched position to allow unimpeded rotation of the swivel mechanism.

39 Claims, 15 Drawing Sheets

(56) References Cited

U.S. PATENT DOCUMENTS

| | | | |
|---|---|---|---|
| 5,000,505 A | | 3/1991 | Kawashita et al. |
| 5,568,960 A | * | 10/1996 | Oleson .................. B60N 2/143 |
| | | | 297/344.22 |
| 5,810,441 A | | 9/1998 | Ezuka et al. |
| 6,447,065 B1 | | 9/2002 | Ropp |
| 6,575,420 B2 | | 6/2003 | Yoshida et al. |
| 7,434,863 B2 | | 10/2008 | Hamazaki et al. |
| 7,648,186 B2 | | 1/2010 | Ukai et al. |
| 9,180,792 B2 | | 11/2015 | Haller et al. |
| 9,227,529 B2 | | 1/2016 | Haller |
| 9,579,995 B2 | | 2/2017 | Haller |
| 9,623,769 B1 | | 4/2017 | Roeglin et al. |
| 2004/0066074 A1 | * | 4/2004 | Ovitt ....................... A47C 3/18 |
| | | | 297/344.21 |
| 2008/0211284 A1 | | 9/2008 | Mutou |
| 2010/0102611 A1 | * | 4/2010 | Bunea .................... B60N 2/146 |
| | | | 297/344.22 |

FOREIGN PATENT DOCUMENTS

| | | | | |
|---|---|---|---|---|
| EP | 3330122 A1 | * | 6/2018 | ............... B60N 2/06 |
| KR | 100490334 | | 2/2004 | |
| KR | 100780251 | | 11/2007 | |

* cited by examiner

SWIVEL MECHANISM FOR ROTATION OF A SEAT IN AN AUTOMOTIVE VEHICLE

CROSS-REFERENCE TO RELATED APPLICATIONS

This application claims priority to and all the benefits of U.S. Provisional Application 62/757,801, filed on Nov. 9, 2018, and U.S. Provisional Application 62/818,779, filed on Mar. 15, 2019, which are hereby incorporated by reference in their entirety.

BACKGROUND OF THE INVENTION

1. Field of the Invention

The present invention relates to a swivel mechanism for allowing rotation of a seat assembly in an automotive vehicle.

2. Description of Related Art

Swivel mechanisms for allowing rotation of a seat in an automotive vehicle are known in the art. Typical swivel mechanisms include an upper plate assembly coupled to a lower plate assembly to facilitate axial rotation of the upper plate assembly relative to the lower plate assembly. Often a lock pin extends from the upper plate assembly and a lock plate slidably couples to the lower plate assembly for movement between a locked position and an unlocked position. However, the swivel mechanisms can create adjustment effort spikes and perceived false latch conditions where the seat is not actually in the locked position.

SUMMARY OF THE INVENTION

According to one aspect of the invention, a swivel mechanism is provided for allowing rotation of a seat in an automotive vehicle. In a preferred embodiment, the swivel mechanism includes a first plate assembly coupled to a second plate assembly to facilitate axial rotation of one of the first and second plate assemblies relative to the other of the first and second plate assemblies. A lock pin extends from the first plate assembly. A lock plate is slidably coupled to the second plate assembly for movement between a locked position in which the lock plate is engaged with the lock pin to prevent rotation between the first plate assembly and the second plate assembly, and an unlocked position in which the lock plate is disengaged from the lock pin to allow rotation of one of the first and second plate assemblies relative to the other of the first and second plate assemblies. A wedge is slidably coupled to the second plate assembly for movement between a cinched position in which the wedge is frictionally engaged with the first plate assembly to stabilize the swivel mechanism, and an uncinched position disengaged from the first plate assembly to allow unimpeded rotation of one of the first and second plate assemblies relative to the other of the first and second plate assemblies.

According to another aspect of the invention, a seat assembly is provided for supporting an occupant in an automotive vehicle. The seat assembly includes a pair of laterally-spaced seat brackets. A seat cushion and a seat back couple to the laterally-spaced seat brackets for supporting an occupant in the automotive vehicle. A swivel mechanism is coupled to the laterally-spaced seat brackets and includes a first plate assembly coupled to a second plate assembly to facilitate axial rotation of one of the first and second plate assemblies relative to the other of the first and second plate assemblies. A lock pin extends from the first plate assembly and a lock plate is slidably coupled to the second plate assembly. The lock plate moves between a locked position in which the lock plate is engaged with the lock pin to prevent rotation between the first plate assembly and the second plate assembly, and an unlocked position in which the lock plate is disengaged from the lock pin to allow rotation of one of the first and second plate assemblies relative to the other of the first and second plate assemblies. A wedge is slidably coupled to the second plate assembly for movement between a cinched position in which the wedge is frictionally engaged with the first plate assembly to stabilize the swivel mechanism, and an uncinched position disengaged from the first plate assembly to allow unimpeded rotation of one of the first and second plate assemblies relative to the other of the first and second plate assemblies.

BRIEF DESCRIPTION OF THE DRAWINGS

Advantages of the present disclosure will be readily appreciated as the same becomes better understood by reference to the following detailed description when considered in connection with the accompanying drawings, wherein.

DETAILED DESCRIPTION OF THE EMBODIMENTS

Figure 1:
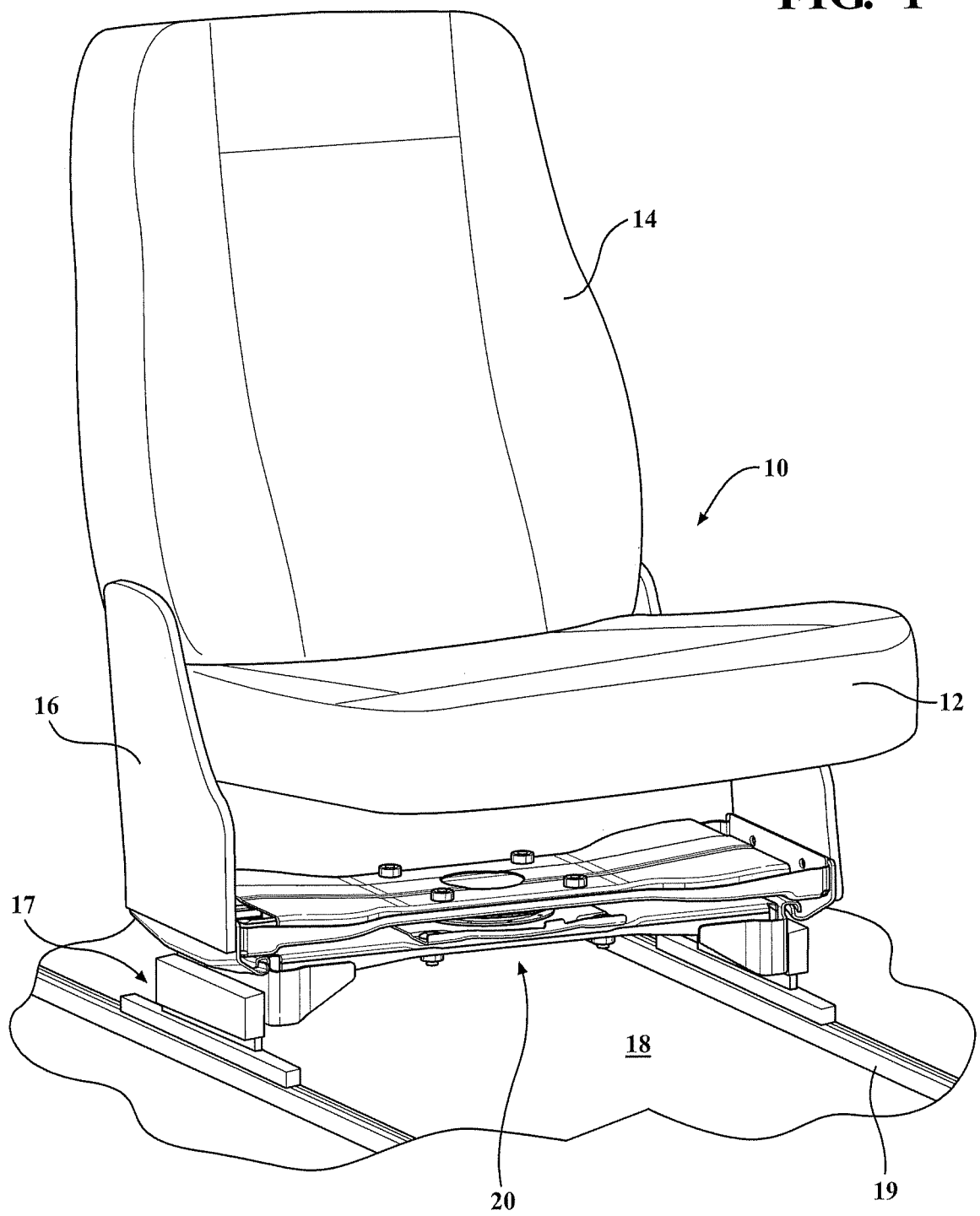
FIG. 1 is a perspective view of a seat assembly with an integrated swivel mechanism for rotation in an automotive vehicle.
Figure 2:
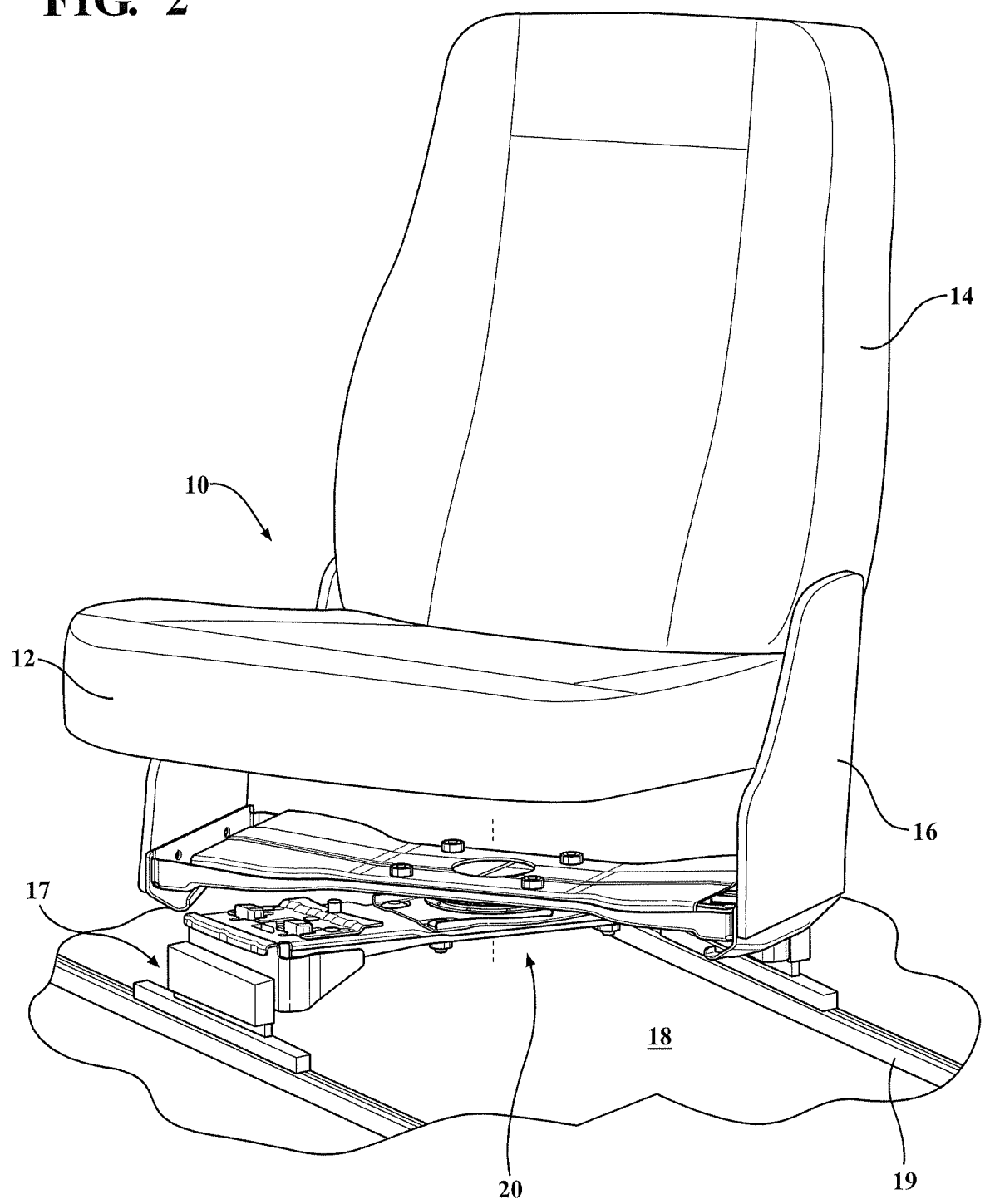
FIG. 2 is a perspective view of the seat assembly of FIG. 1 where the swivel mechanism is in mid-rotation.

FIGS. 1 and 2 show a seat assembly 10 for supporting an occupant in an automotive vehicle. The seat assembly 10 includes a seat cushion 12 and a seat back 14. The seat cushion 12 is supported between a pair of laterally spaced apart seat brackets 16. The seat back 14 is also supported between the seat brackets 16 and may pivot between a plurality of reclined seating positions and a fold flat position overlapping the seat cushion 12 as is commonly known in the art. The seat assembly 10 further includes a swivel mechanism 20 coupled to the seat brackets 16 for providing rotation of the seat assembly 10 in the automotive vehicle. The swivel mechanism 20 shown in FIGS. 1 and 2 provides rotation of the seat assembly 180 degrees between a forward facing position and an opposite rearward facing position. However, it should be appreciated that the swivel mechanism 20 may provide rotation of the seat assembly 10 by any rotational degree between a variety of positions. The seat assembly 10 may further include a lower riser structure 17 attached between the swivel mechanism 20 and a floor 18 of the vehicle for mounting and elevating the seat assembly 10 above the vehicle floor 18. The lower riser structure 17 may be mounted directly to the floor 18 of the vehicle or slidably coupled to a seat track assembly 19 for providing fore and aft sliding movement of the seat assembly 10 in the vehicle as is also commonly known in the art. However, it should be appreciated that the swivel mechanism 20 may be mounted directly to the floor 18 of the vehicle or the seat track assembly 19 without varying from the scope of the invention.

Figure 3:
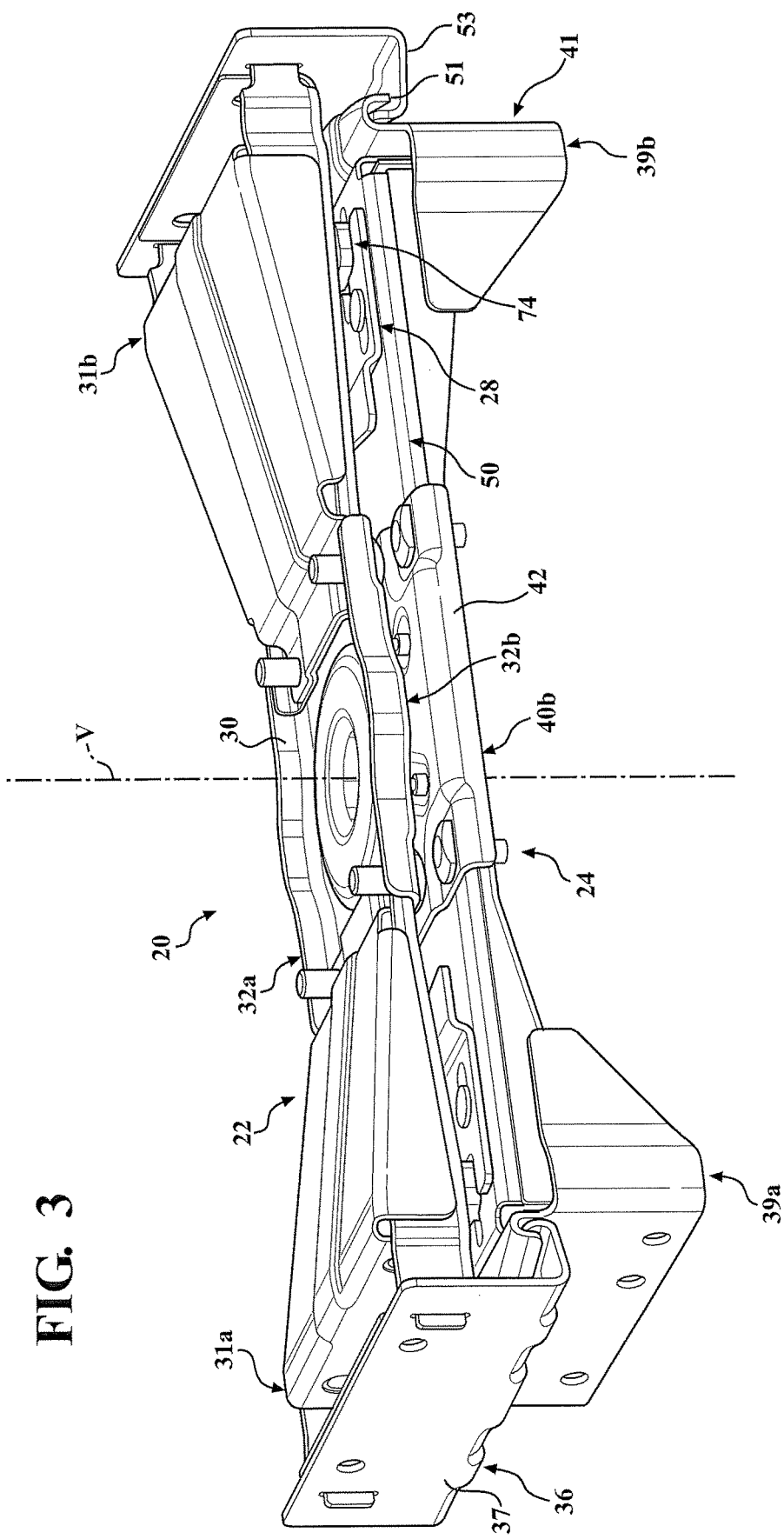
FIG. 3 is a perspective view of the swivel mechanism for allowing rotation of a seat in an automotive vehicle according to one embodiment of the present invention.
Figure 4:
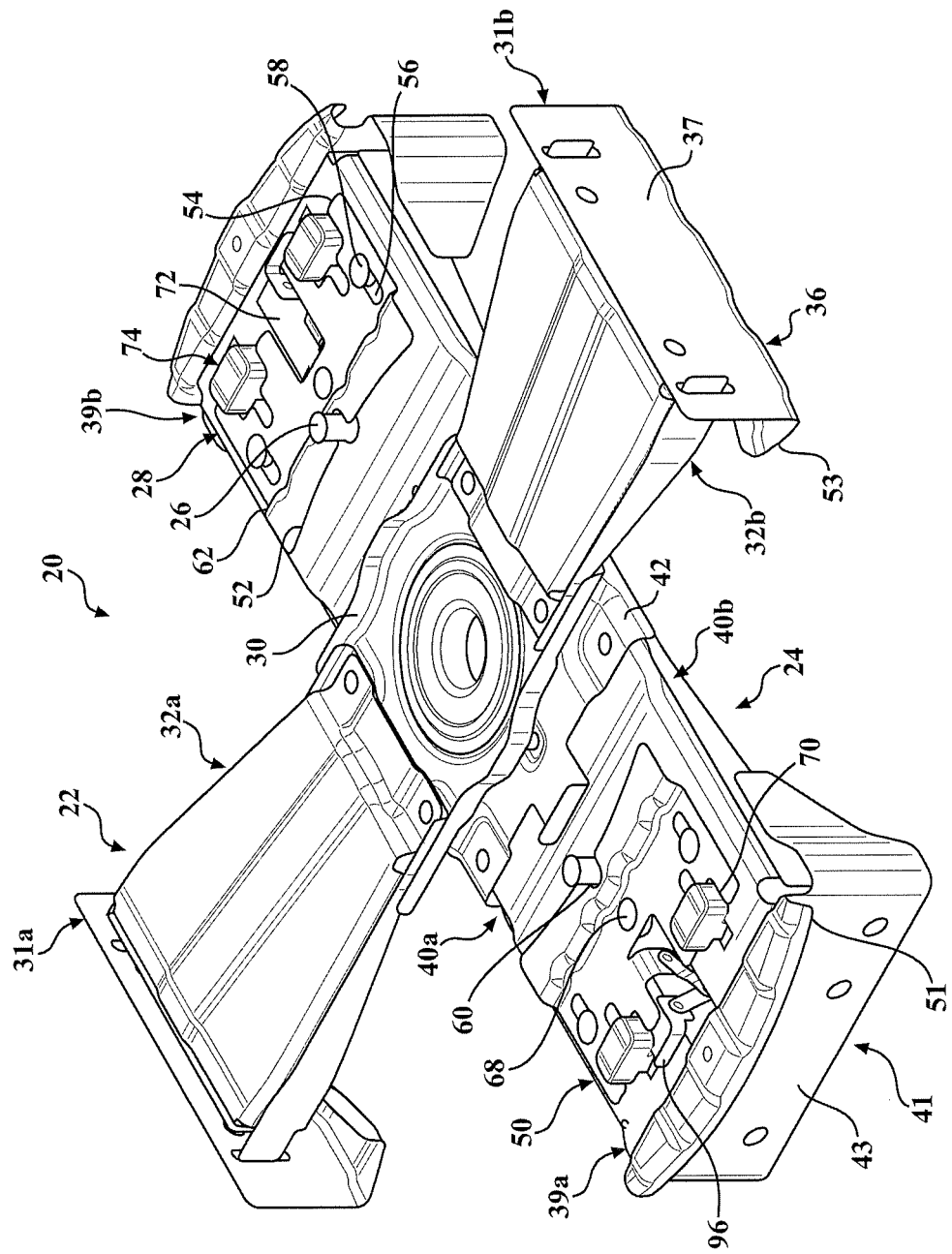
FIG. 4 is a perspective view of the swivel mechanism of FIG. 3 where the swivel mechanism is in mid-rotation.
Figure 5:
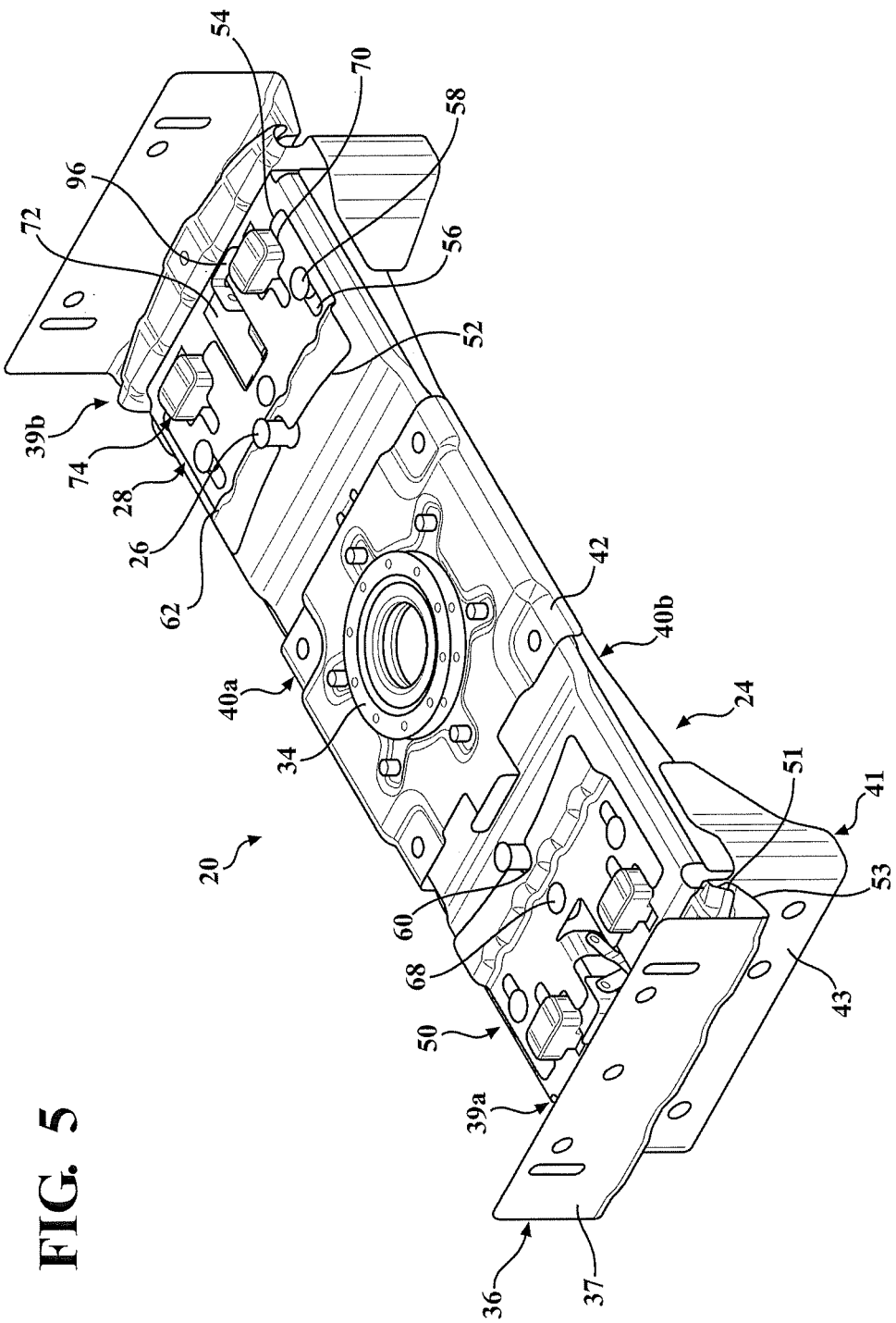
FIG. 5 is a fragmentary perspective view of the swivel mechanism of FIG. 3.

Referring to FIGS. 3-5, one embodiment of the swivel mechanism 20 is shown including a first, or upper, plate assembly 22 coupled to a second, or lower, plate assembly 24 to facilitate axial rotation of the first plate assembly 22 relative to the second plate assembly 24, thereby allowing the seat assembly 10 to rotate within the automotive vehicle. In this embodiment, the second plate assembly 24 of the swivel mechanism 20 is laterally coupled to the lower riser structure 17, which is further secured to the vehicle floor 18. Alternatively, the second plate assembly 24 of the swivel mechanism 20 can instead secure directly to the vehicle floor 18 or the seat track assembly 19 without varying the scope of the invention. The first plate assembly 22 of the swivel mechanism 20 is laterally coupled to and between the seat brackets 16.

The first plate assembly 22 of the swivel mechanism 20 extends longitudinally between opposite first and second ends 31a, 31b interconnected by opposite and substantially parallel edges 32a, 32b. The first plate assembly 22 further includes a rectangular first center swivel portion 30 positioned centrally between the first and second ends 31a, 31b for accepting a first side of a rolling-element bearing pack 34 as will be further described below. A first mounting bracket 36 is fixedly secured to each end 31a, 31b of the first plate assembly 22 for coupling the first plate assembly 22 to and between the seat brackets 16.

The second plate assembly 24 is similar in size to the first plate assembly 22 and extends longitudinally between opposite first and second ends 39a, 39b interconnected by opposite and substantially parallel edges 40a, 40b. The second plate assembly 24 further comprises a substantially planar second center swivel portion 42 positioned centrally between the first and second ends 39a, 39b for accepting a second side of the rolling-element bearing pack 34. A second mounting bracket 41 is fixedly secured to each end 39a, 39b of the second plate assembly 24 for coupling the second plate assembly 24 to the lower riser structure 17, seat track assembly 19, or floor 18 of the vehicle.

The rolling-element bearing pack 34 is fixedly coupled between the first center swivel portion 30 and the second center swivel portion 42 to rotatably couple the first and second plate assemblies 22, 24 along a vertical axis V relative to the vehicle floor 18 running centrally through the rolling-element bearing pack 34. In an alternative embodiment, shown in FIGS. 7A and 7B, the swivel mechanism 20 comprises a first bearing bracket 110 extending radially from the first plate assembly 22 towards the vertical axis V and a second bearing bracket 111 extending radially from the second plate assembly 24 towards the vertical axis V and spaced generally parallel to the first bearing bracket 110. A central retaining ring 112 extends axially from the second center swivel portion 42 forming an outwardly projecting radial flange 113 spaced parallel to the first bearing bracket 110 on the side opposite the second bearing bracket 111. A plurality of lateral stability ball bearings 114 are seated between the first bearing bracket 110 and the second bearing bracket 111 for rotatably supporting and vertically stabilizing the first plate assembly 22 relative to the second plate assembly 24. A plurality of lower medial ball bearings 115 are seated between the first bearing bracket 110 and the second bearing bracket 111 and a plurality of upper medial ball bearings 116 are seated between the first bearing bracket 110 and the radial flange 113 of the central retaining ring 112 for rotatably supporting the first plate assembly 22 relative to the second plate assembly 24. Additionally, the first bearing bracket 110 is captured between the radial flange 113 of the retaining ring 112 and the second bearing bracket 111 to rotatably couple the first plate assembly 22 to the second plate assembly 24. It is also to be appreciated that alternative means of providing rotation between the first and second plate assemblies 22, 24 may be used, including various types of bearings or any of a variety of low-friction materials.

Each of first mounting brackets 36 of the first plate assembly 22 include a planar mounting plate 37 secured to the respective end 31a, 31b of the first plate assembly 22 for mounting the first plate assembly 22 to the seat brackets 16. A first J-shaped hook 53 extends from a lower end of the mounting plate 37 facing the second plate assembly 24. Similarly, each of the second mounting brackets 41 of the second plate assembly 24 include a planar mounting plate 43 secured to the respective end 39a, 39b of the second plate assembly for mounting the second plate assembly 24 to the lower riser structure 17. A second J-shaped hook 51 extends from an upper end of the mounting plate 43 facing the first plate assembly 22. Each first J-shaped hook 53 matingly overlaps with and interconnects to each second J-shaped hook 51 to selectively prevent separation of the first and second plate assemblies 22, 24 when the swivel mechanism 20 is in a locked condition and especially during automobile accidents or when subjected to other abrupt forces.

Referring to FIGS. 6A-6C and FIGS. 7A and 7B, the swivel mechanism 20 includes a locking and stabilizing structure 50 disposed between the first and second plate assemblies 22, 24 adjacent to each of the opposite respective ends thereof. The locking and stabilizing structures 50 have analogous configurations and function simultaneously to secure and actuate the swivel mechanism 20. Each locking and stabilizing structure 50 broadly includes a lock pin 26, a lock plate 28, a pair of wedges 74, and associated structures, as is described in the following paragraphs.

The lock pin 26 is generally cylindrical in shape and extends vertically from the first plate assembly 22 into an interior space 48 defined between the first and second plate assemblies 22, 24, the lock pin 26 terminating prior to the second plate assembly 24. The lock plate 28 is slidably coupled to the second plate assembly 24 in the interior space 48 for movement between a locked position in which the lock plate 28 is engaged with the lock pin 26 to prevent axial rotation about the vertical axis V, and an unlocked position in which the lock plate 28 is disengaged from the lock pin 26 to allow axial rotation about the vertical axis V. The lock plate 28 is substantially rectangular and includes a medial edge 52 and a lateral edge 54 relative to the vertical axis V, where the medial edge 52 curves concavely toward the vertical axis V and the lateral edge 54 is adjacent the end 39a, 39b of the second plate assembly 24. A step, or offset portion, 62 located at the medial edge 52 of the lock plate 28 extends into the interior space 48 to meet and engage with the lock pin 26.

In order to secure the lock plate 28 to the second plate assembly 24, the lock plate 28 has a pair of parallel longitudinal projection cutouts 56 with a first end 57 and a second end 59. Each projection cutout 56 receives a projection, such as a rivet 58. The rivets 58 extend from the second plate assembly 24 through the projection cutouts 56 to slidably couple the lock plate 28 to the second plate assembly 24. Interaction of the rivets 58 and the first and second end 57, 59 of the projection cutouts 56 ultimately establishes travel limits of the lock plate 28 on the second plate assembly 24.

Figure 6A:
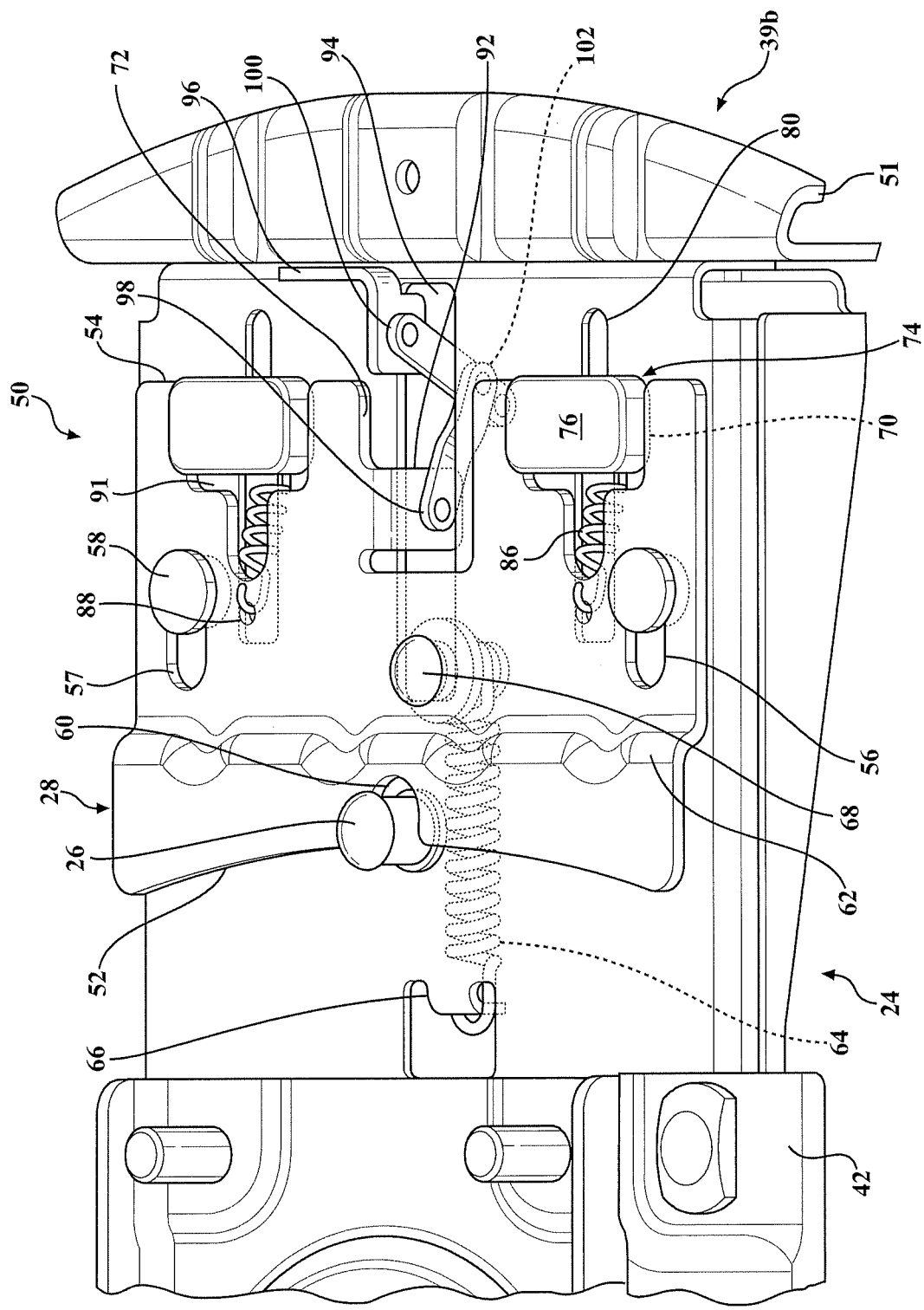
FIG. 6A is a fragmentary perspective view of a locking and stabilizing structure of the swivel mechanism of FIG. 3 in a locked position.

A lock pin cutout 60 is disposed centrally on the medial edge 52 of the lock plate 28 to accept the lock pin 26. A lock plate spring 64 provides a biasing force and extends longitudinally from a medial attachment point 66 on the second plate assembly 24 to a lock plate spring rivet 68 disposed laterally adjacent to the lock pin cutout 60. The lock plate spring rivet 68 extends through both the lock plate 28 and the second plate assembly 24 for attachment to the lock plate spring 64. As shown in FIG. 6A, the lock plate 28 is therefore biased by the lock plate spring 64 toward the vertical axis V to the locked position in which the lock pin 26 is secured within the lock pin cutout 60 and the rivets 58 are disposed in the second ends 59 of the projection cutouts 56.

Figure 8:
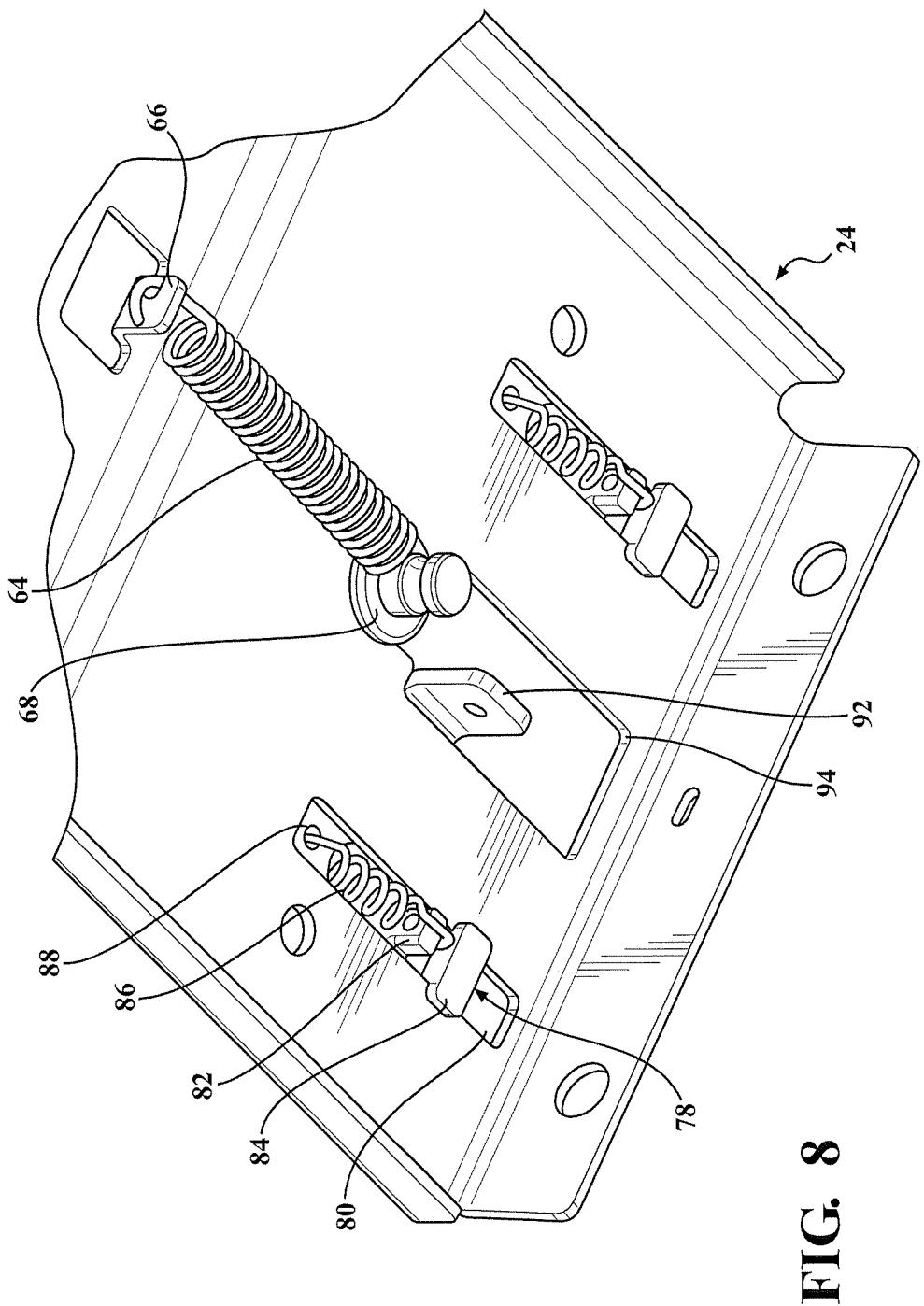
FIG. 8 is a fragmentary perspective view of an underside of a second plate assembly of the swivel mechanism of FIG. 3.
Figure 9:
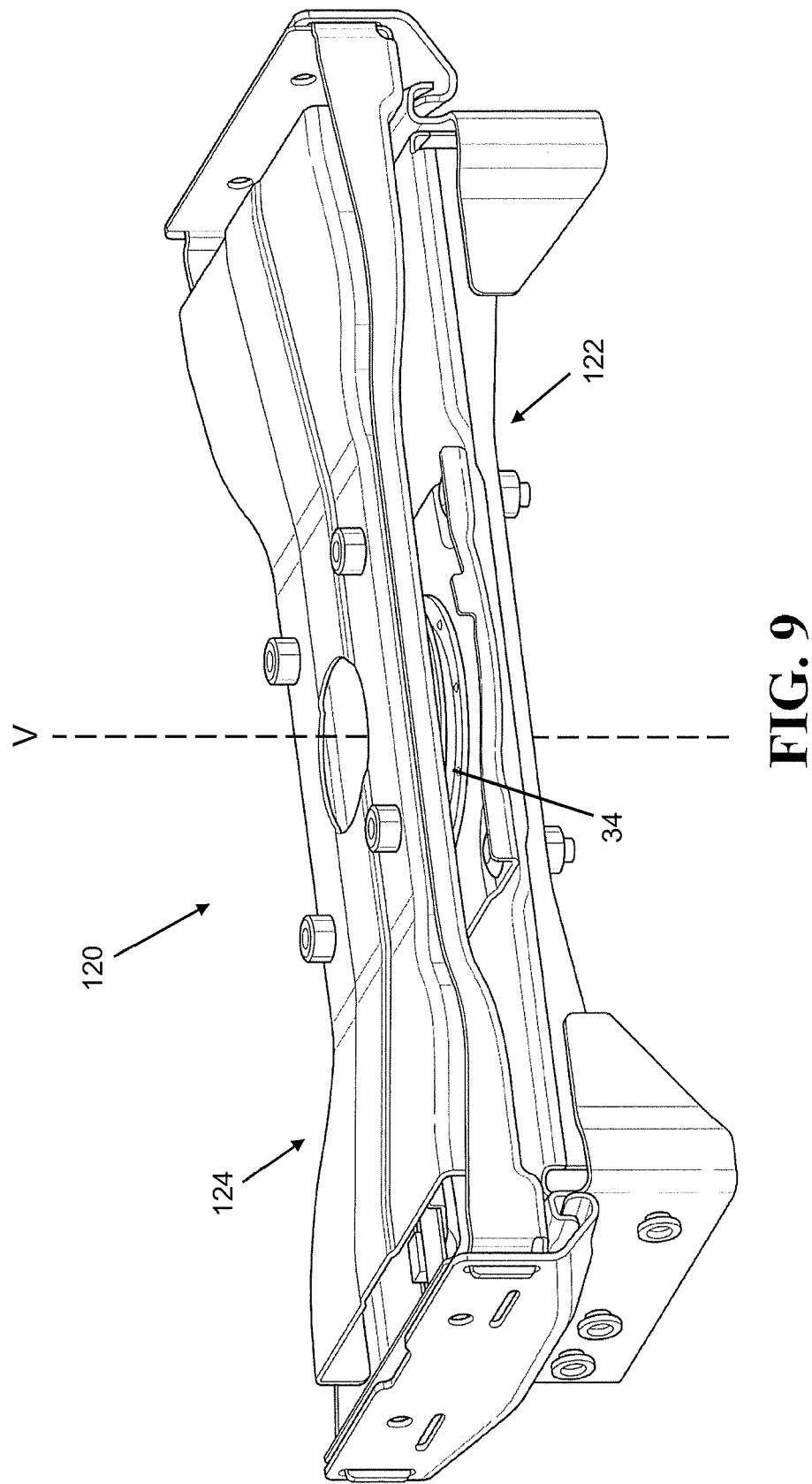
FIG. 9 is a perspective view of a swivel mechanism for allowing rotation of a seat in an automotive vehicle according to an alternative embodiment of the present invention.
Figure 10:
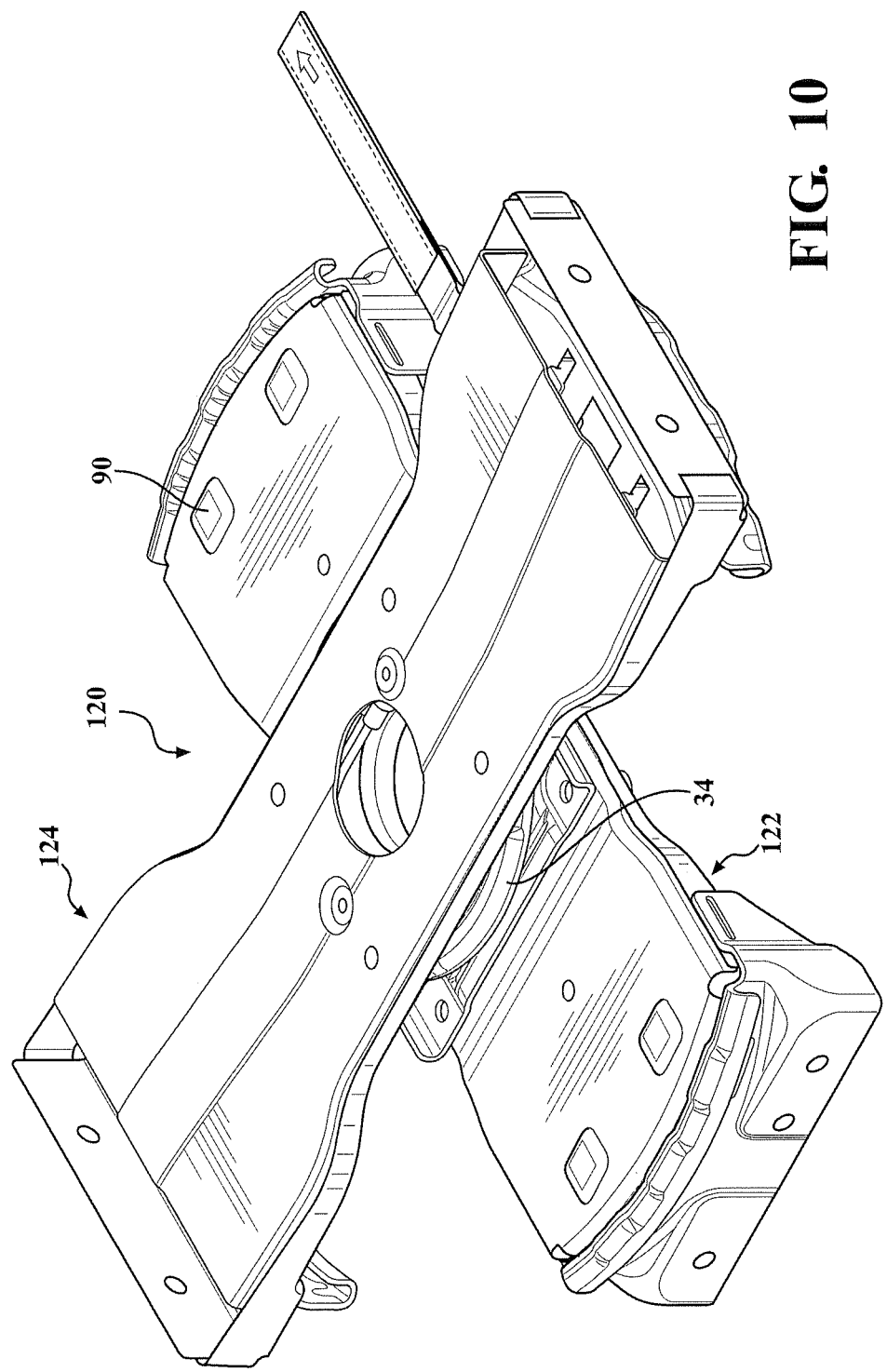
FIG. 10 is a perspective view of the swivel mechanism of FIG. 9 where the swivel mechanism is in mid-rotation.
Figure 11:
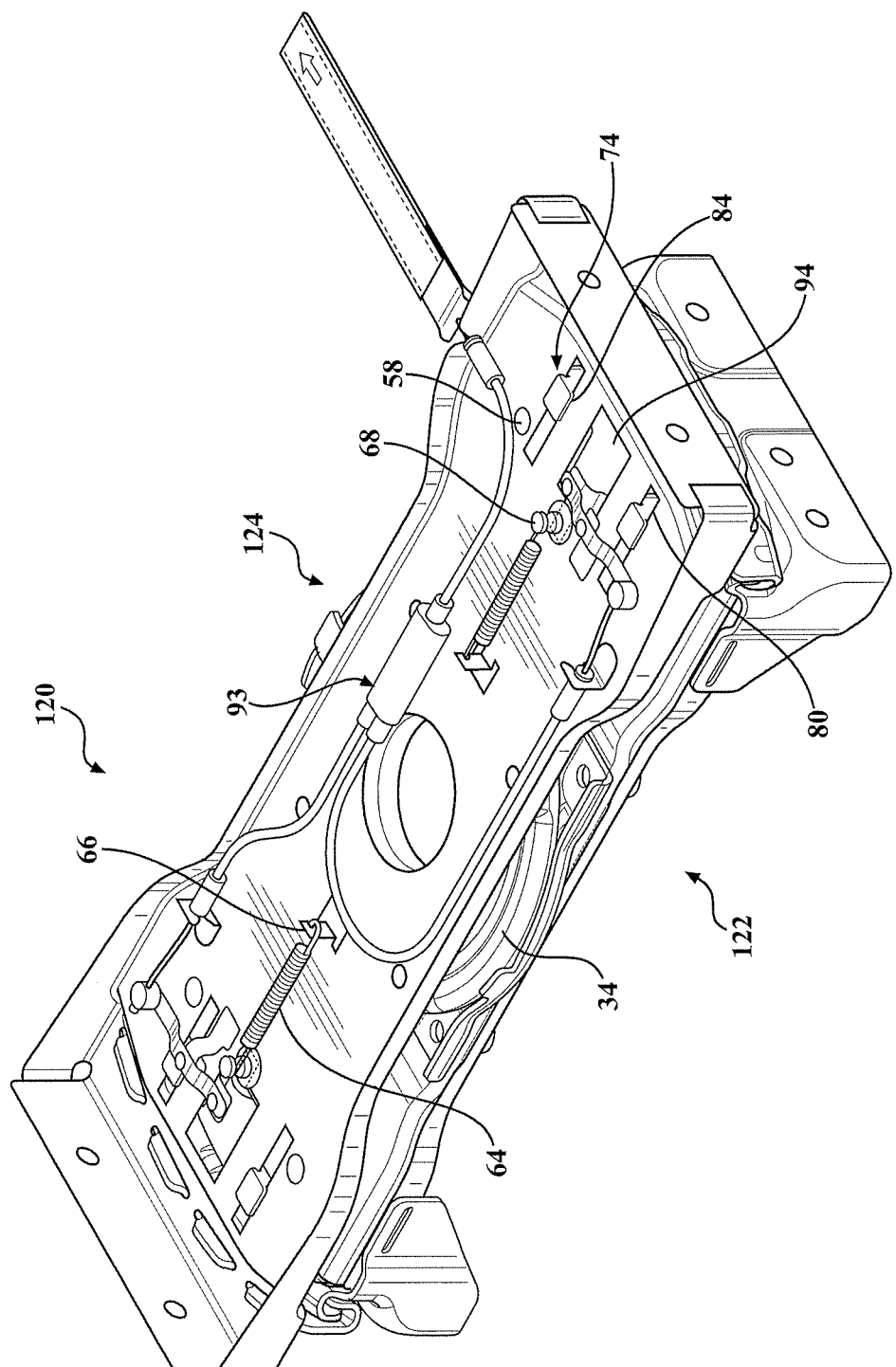
FIG. 11 is a fragmentary perspective view of the swivel mechanism of FIG. 9.
Figure 12:
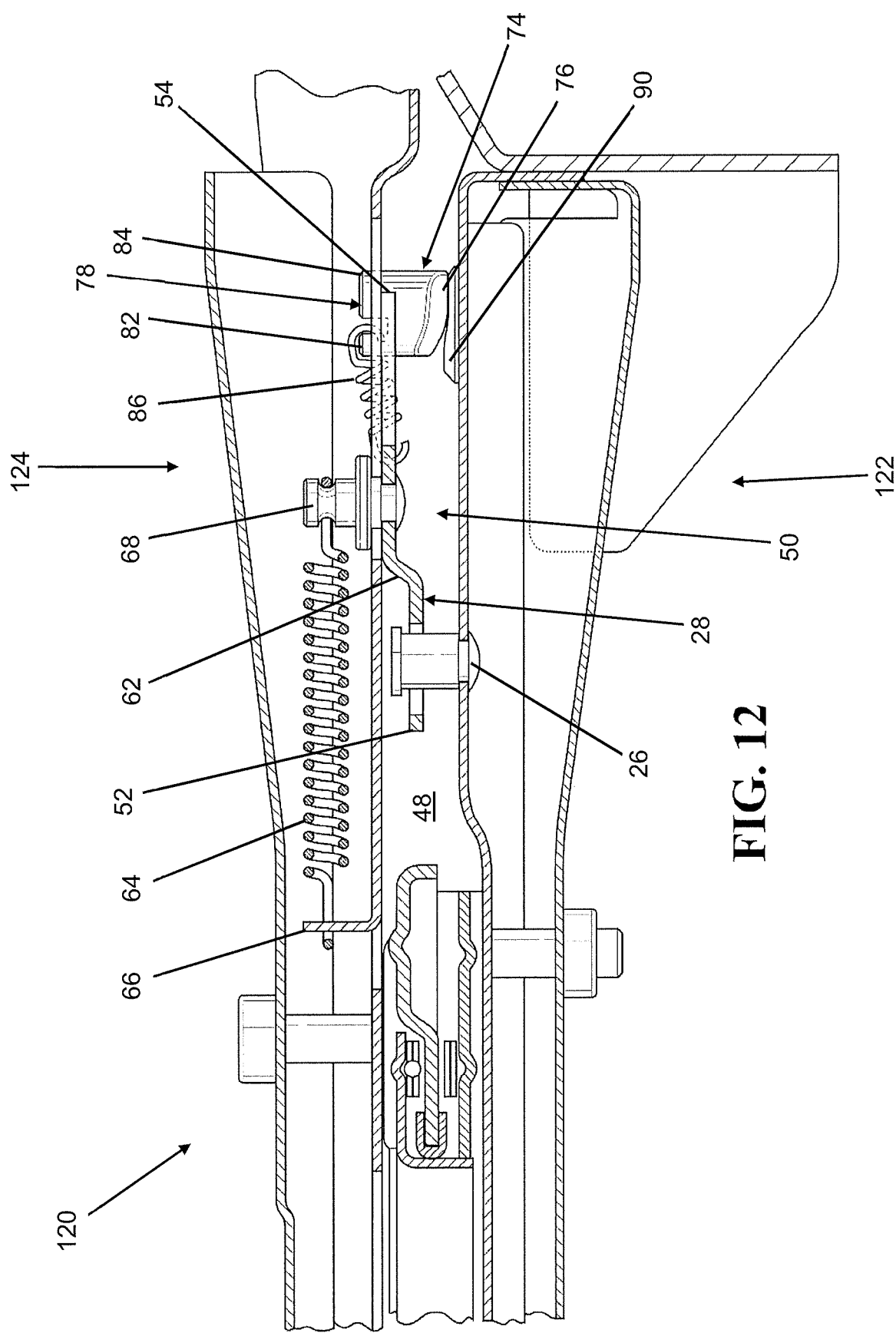
FIG. 12 is a fragmentary cross-sectional view of the swivel mechanism of FIG. 9 with a wedge in a cinched position.

The lateral edge 54 of the lock plate 28 includes a pair of lock plate wedge cutouts 70 that are substantially rectangular and flank a medial cutout 72. The lock plate wedge cutouts 70 accept the pair of wedges 74. Each wedge 74 extends vertically into the interior space 48 and has a first wedge surface 76 that engages the first plate assembly 22 and a second wedge surface 78 slidably secured to a longitudinal wedge cutout 80 on the second plate assembly 24 by a seating tab 82 and a pair of feet 84 (seen in FIG. 8). The longitudinal wedge cutouts 80 allow the wedges 74 to slide longitudinally along the second plate assembly 24 upon contact with the lock plate wedge cutouts 70. The wedges 74 are spring biased toward the vertical axis V with a biasing force from a wedge spring 86. The wedge springs 86 are, attached to the second wedge surface 78 of each wedge 74 and extend to a wedge spring attachment point 88 on the lock plate 28 medially adjacent to each lock plate wedge cutout 70.

The first plate assembly 22 includes a pair of wedge-shaped protrusions 90 extending vertically into each interior space 48 to meet and frictionally engage the first wedge surfaces 76. The wedges 74 are biased to a cinched position engaged with the wedge-shaped protrusions 90 due to the biasing force of the wedge spring 86. Referring to FIG. 6A, there is a gap 91 located between the lock plate wedge cutouts 70 and the wedges 74 when in the cinched position to ensure the wedges 74 are not blocked from engaging the wedge-shaped protrusions 90 due to contact with the lock plate 28. The cinched position helps to stabilize the swivel mechanism 20 by preventing tipping of the first plate assembly 22 relative to the second plate assembly 24 where the first plate assembly 22 is no longer disposed horizontally parallel to the second plate assembly 24. The wedges 74 can also move to an uncinched position, disengaged with the wedge-shaped protrusions 90, to allow unimpeded rotation of the first and second plate assemblies 22, 24. One benefit of the swivel mechanism 20 of the present disclosure is that the uncinched position of the wedges 74, fully disengaged from the wedge-shaped protrusions 90, helps to prevent adjustment effort spikes and false latching perceived by the occupant when rotating the seat assembly 10.

The swivel mechanism 20 further includes a means for simultaneously actuating the locking and stabilizing structures 50 between the locked and unlocked positions. A handle bracket tab 92 extends from the lock plate 28 at the medial cutout 72 through a handle cutout 94 on the second plate assembly 24. Conventional means of handle actuation known in the art, such as a cable-type actuation assembly 93, are attached to the handle bracket tab 92 of each of the locking and stabilizing structures 50. In a preferred embodiment shown in FIGS. 6A-6C, a stopper 96 located laterally adjacent to each medial cutout 72 extends from the second plate assembly 24 into the interior space 48. A first oblong lever arm 98 is rotatably coupled to the handle bracket tab 92 and a second oblong lever arm 100 is rotatably coupled to the stopper 96. The first and second lever arms 98, 100 extend through the handle cutout 94. The first lever arm 98 rotatably couples at a midpoint 102 on the second lever arm 100. A handle mechanism known in the art (not shown) is then attached to each second lever arm 100 for simultaneous actuation of each locking and stabilizing structure 50 of the swivel mechanism 20.

In one embodiment, shown in FIGS. 3-5, the first plate assembly 22 rotates axially around the vertical center axis V relative to the second plate assembly 24. In an alternative embodiment, shown in FIGS. 9-12, the swivel mechanism 20 is flipped upside down and the second plate assembly 24 rotates axially around the vertical axis V relative to the first plate assembly 22. The alternative swivel mechanism is shown at 120 of FIGS. 9-12 where, other than configuration of the first and second plate assemblies in the seat assembly 10, the swivel mechanism of the prior embodiment 20 is similar. Therefore, like elements of the swivel mechanism, such as the locking and stabilizing structure 50, will include like element numbers and will not be further explained herein.

The alternative embodiment of the swivel mechanism 120 includes a first, or lower, plate assembly 122 coupled to a second, or upper, plate assembly 124 to facilitate axial rotation of the second plate assembly 124 relative to the first plate assembly 122. In this alternative embodiment, the first plate assembly 122 of the swivel mechanism 120 is coupled to the lower riser structure 17, which is further mounted directly to the floor 18 of the vehicle or slidably coupled to the seat track assembly 19. Alternatively, the first plate assembly 122 of the swivel mechanism 120 can instead secure directly to the vehicle floor 18 or the seat track assembly 19. The second plate assembly 124 of the swivel mechanism 120 is coupled to the seat brackets 16 to allow the seat assembly 10 to rotate within the automotive vehicle.

The second plate assembly 124 and the accompanying locking and stabilizing structure 50 are therefore located vertically above the first plate assembly 122 relative to the vertical axis V.

Figure 7A:
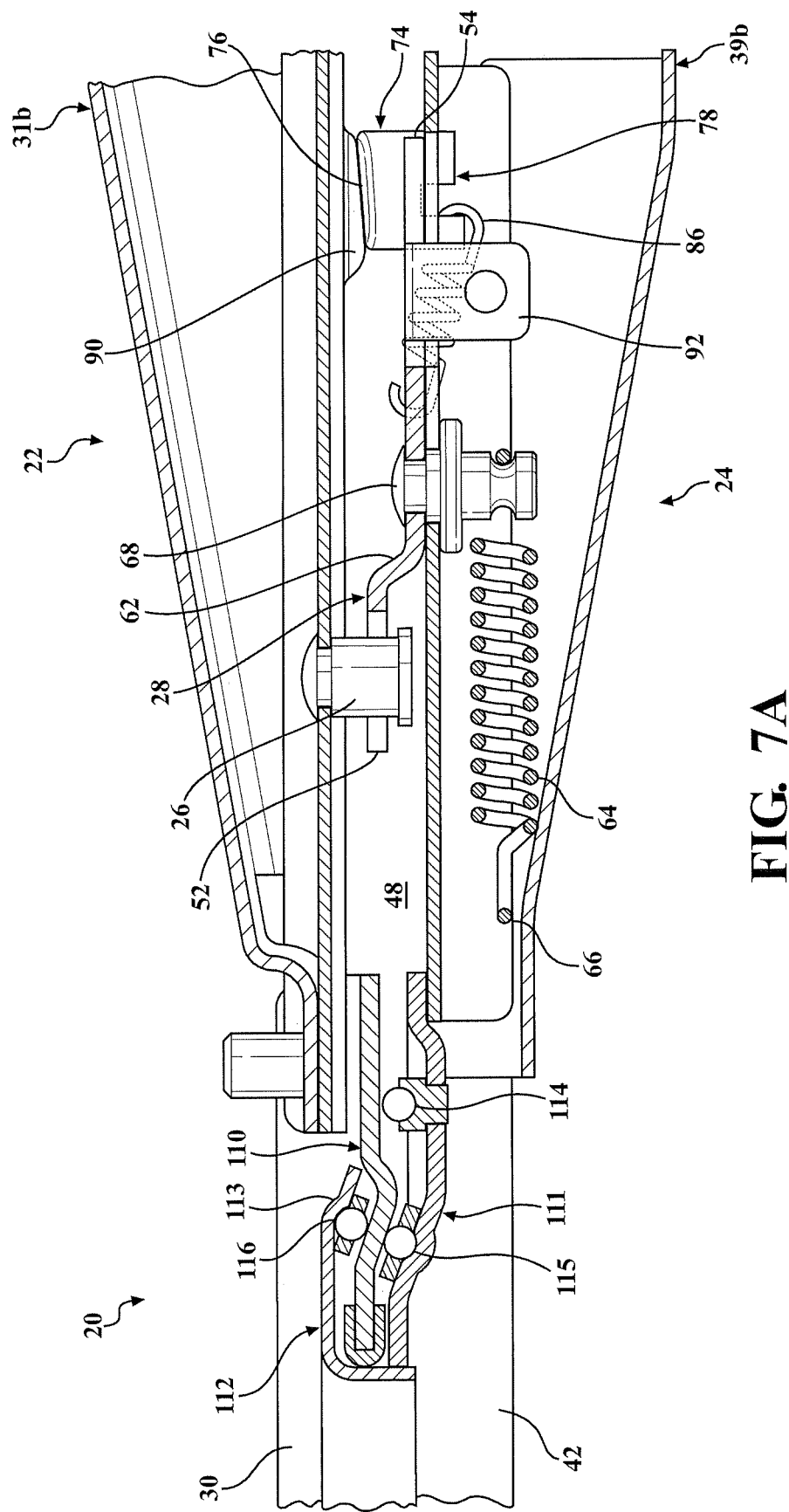
FIG. 7A is a fragmentary cross-sectional view of the swivel mechanism of FIG. 3 with a wedge in a cinched position.

Referring to FIGS. 6A and 7A, the lock plate 28 of each locking and stabilizing structure 50 is in the locked position prior to operation of the swivel mechanism 20. The lock plate springs 64 bias the lock plates 28 toward the vertical axis V and into the locked position. Each lock pin 26 is therefore secured within the lock pin cutout 60, and the rivets 58 are disposed in the second ends 59 of the projection cutouts 56. Further, the wedges 74 are in the cinched position, frictionally engaged with the wedge-shaped protrusions 90.

Figure 6B:
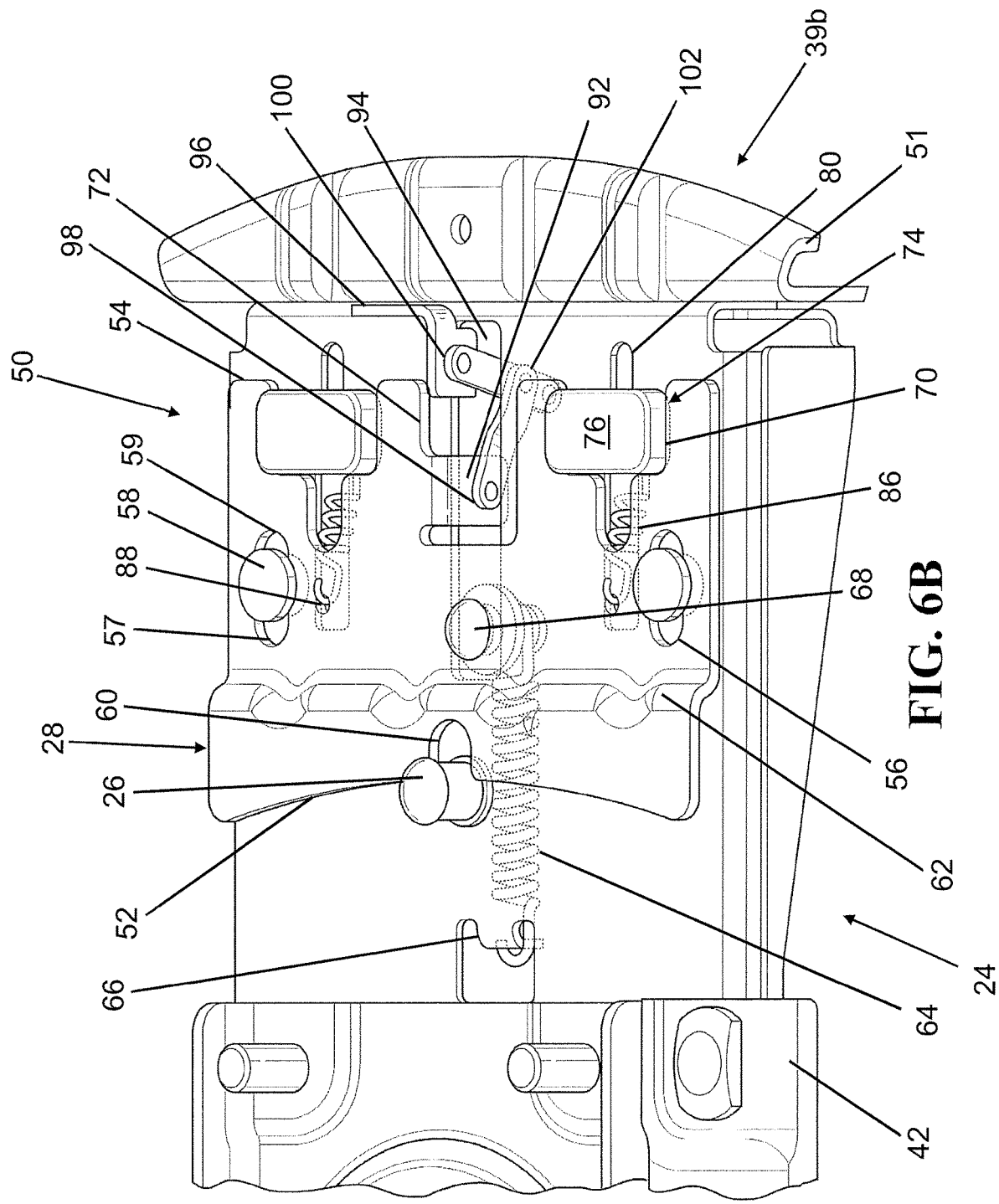
FIG. 6B is a fragmentary perspective view of a locking and stabilizing structure of the swivel mechanism of FIG. 3 in an intermediate position.
Figure 7B:
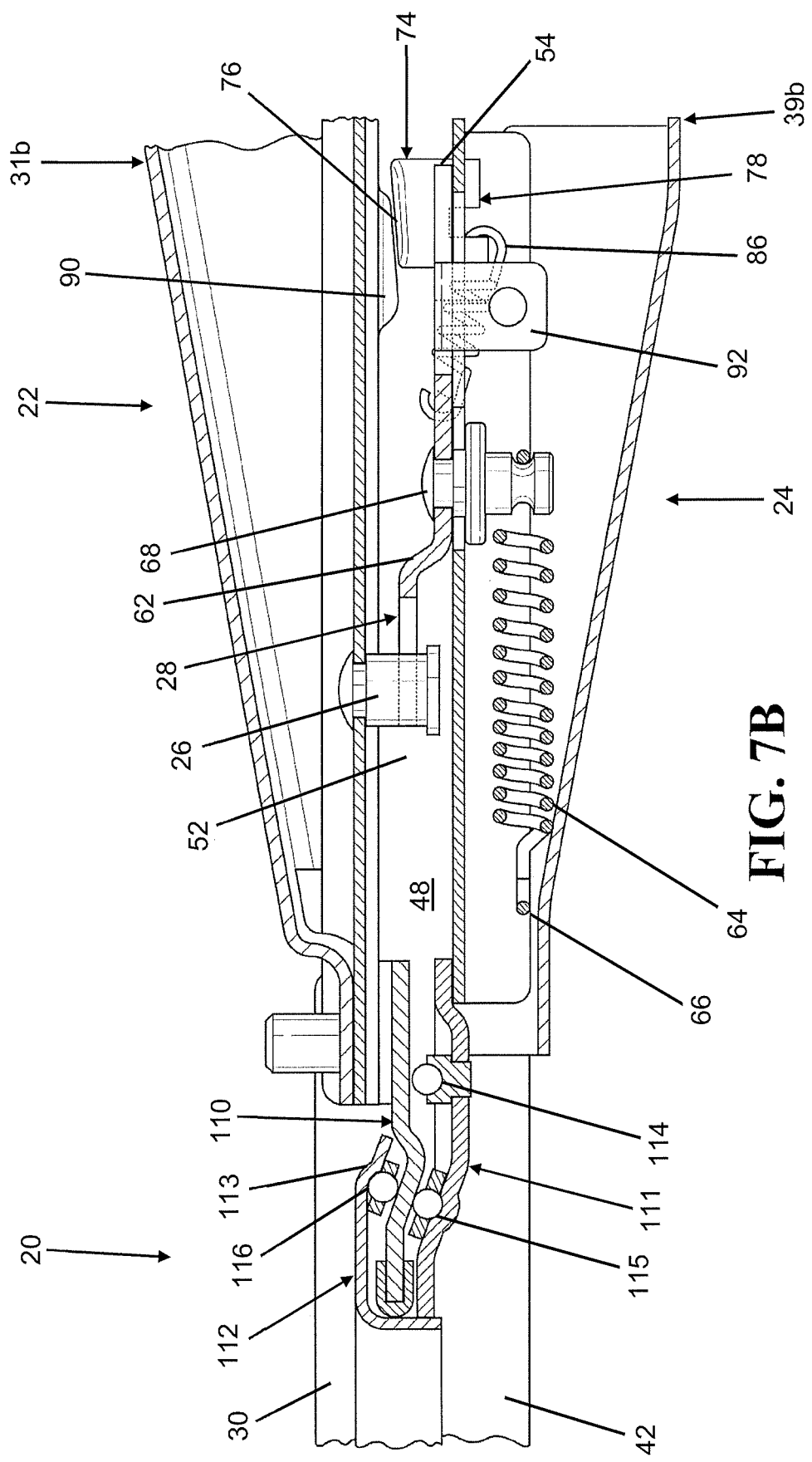
FIG. 7B is a fragmentary cross-sectional view of the swivel mechanism of FIG. 3 with the wedge in an uncinched position.

To operate the swivel mechanism 20, a user first actuates a handle of the handle mechanism (not shown). Actuation of the handle mechanism simultaneously supplies force to each locking and stabilizing structure 50 sufficient to overcome the biasing force of each lock plate spring 64. The lock plates 28 begin to slide laterally away from the vertical axis V and enter an intermediate position where the rivets 58 are located between the first and second ends 57, 59 of the projection cutouts 56, as shown in FIG. 6B. In the intermediate position, each lock pin 26 remains secured within the lock pin cutout 60 while the lock plate wedge cutouts 70 contact and slide the wedges 74 along the longitudinal wedge cutouts 80 to the uncinched position, fully disengaged from the wedge-shaped protrusions 90, as shown in FIG. 7B.

Figure 6C:
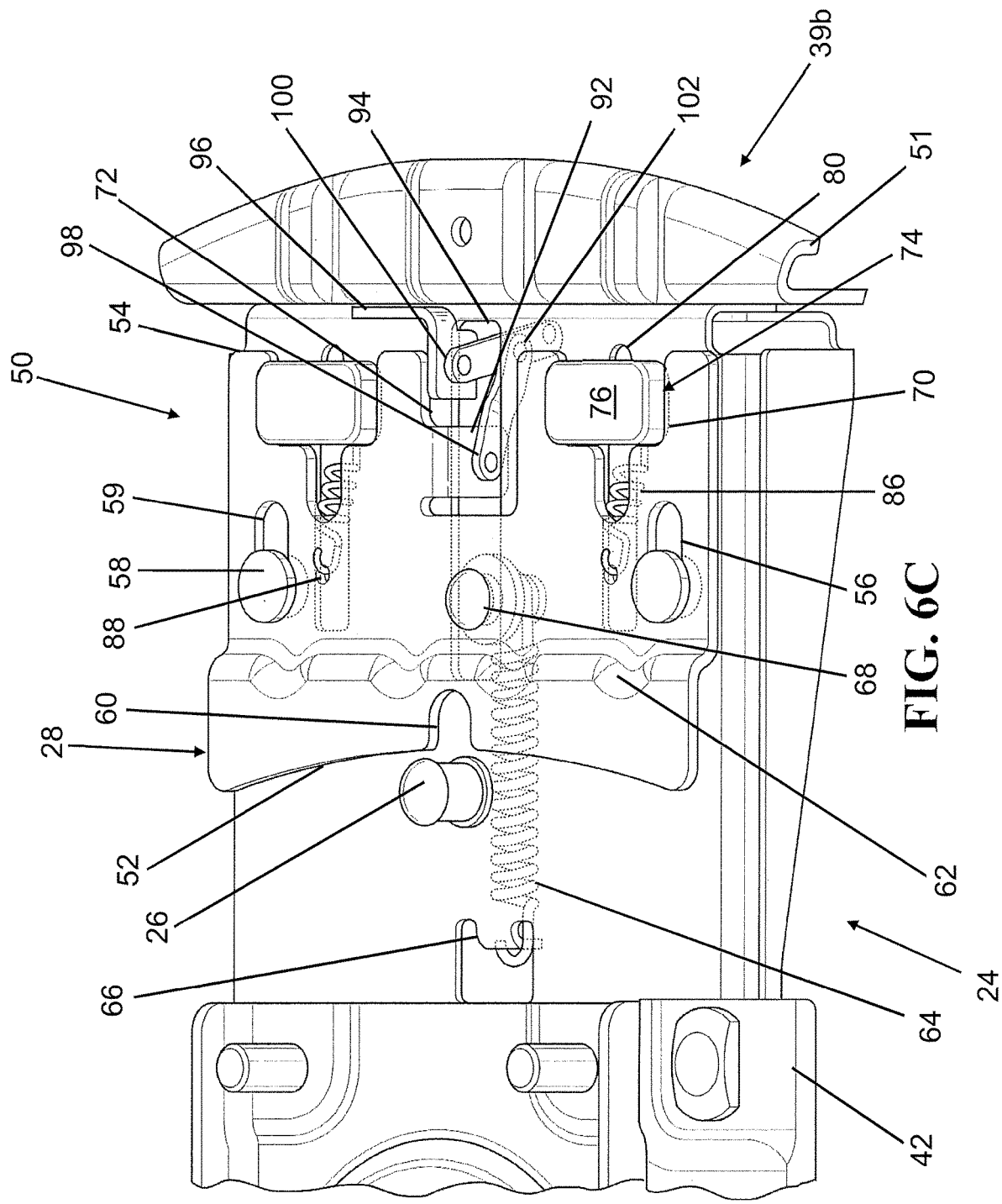
FIG. 6C is a fragmentary perspective view of a locking and stabilizing structure of the swivel mechanism of FIG. 3 in an unlocked position.

After the wedges 74 are in the uncinched position, the lock plates 28 subsequently slide further away from the vertical axis V. The lock pins 26 then disengage from the lock pin cutouts 60 and the lock plates 28 enter the unlocked position, as shown in FIG. 6C, wherein the rivets 58 are displaced in the first ends 57 of the projection cutouts 56. The first plate assembly 22 can now freely rotate relative to the second plate assembly 24 around the vertical axis V.

Once the lock pins 26 have rotated past the medial edges 52 of the lock plates 28, the biasing force of the lock plate springs 64 reset the lock plates 28 to a biased position so the rivets 58 are again displaced in the second ends 59 of the projection cutouts 56. Similarly, the biasing force of the wedge springs 86 reset the wedges 74 within the lock plate wedge cutouts 70. The lock plates 28 and wedges 74 remain in the biased position until continued rotation of the swivel mechanism 20 causes the lock pins 26 to contact the medial edge 52 of the lock plates 28. Contact of the lock pins 26 with the lock plates 28 overcomes the biasing force of the lock plate springs 64, thereby sliding the lock plates 28 laterally away from the vertical axis V toward the unlocked position. The lock plate wedge cutouts 70 also slide the wedges 74 laterally along the longitudinal wedge cutouts 80 to the uncinched position so the wedges 74 cannot impede the wedge-shaped protrusions 90 as the first plate assembly 22 rotates relative to the second plate assembly 24. Once the first plate assembly 22 is again oriented above the second plate assembly 24 along the vertical axis V, the lock pin cutouts 60 accept the lock pins 26, resetting the lock plates 28 to the locked position and the wedges 74 to the cinched position, again stabilizing and preventing rotation of the swivel mechanism 20.

The invention has been described in an illustrative manner, and it is to be understood that the terminology which has been used is intended to be in the nature of words of description rather than of limitation. Directional references employed or shown in the description, figures or claims, such as top, bottom, upper, lower, upward, downward, lengthwise, widthwise, longitudinal, lateral, and the like, are relative terms employed for ease of description and are not intended to limit the scope of the invention in any respect. Many modifications and variations of the present invention are possible in light of the above teachings. It is, therefore, to be understood that within the scope of the appended claims, the invention may be practiced other than as specifically described.

What is claimed is:

1. A swivel mechanism for allowing rotation of a seat in an automotive vehicle, the swivel mechanism comprising:
   a first plate assembly coupled to a second plate assembly to facilitate axial rotation of one of the first and second plate assemblies relative to the other of the first and second plate assemblies; and
   a locking and stabilizing structure comprising
      a lock pin extending from the first plate assembly,
      a lock plate slidably coupled to the second plate assembly for movement between a locked position in which the lock plate is engaged with the lock pin to prevent rotation between the first plate assembly and the second plate assembly, and an unlocked position in which the lock plate is disengaged from the lock pin to allow rotation of one of the first and second plate assemblies relative to the other of the first and second plate assemblies, and
      a wedge slidably coupled to the second plate assembly for movement between a cinched position in which the wedge is frictionally engaged with the first plate assembly to stabilize the swivel mechanism, and an uncinched position disengaged from the first plate assembly to allow unimpeded rotation of one of the first and second plate assemblies relative to the other of the first and second plate assemblies.

2. The swivel mechanism of claim 1 wherein actuation of the lock plate between the locked position and the unlocked position actuates movement of the wedge between the cinched position and the uncinched position.

3. The swivel mechanism of claim 2 further comprising a lock plate spring coupled between the lock plate and the second plate assembly to bias the lock plate to the locked position.

4. The swivel mechanism of claim 3 further comprising a wedge spring coupled between the wedge and the lock plate to bias the wedge to the cinched position.

5. The swivel mechanism of claim 4 wherein the lock plate includes a longitudinal projection cutout for receiving a projection therein extending from the second plate assembly to slidably couple the lock plate to the second plate assembly.

6. The swivel mechanism of claim 5 wherein the second plate assembly includes a longitudinal wedge cutout for slidably coupling the wedge to the second plate assembly.

7. The swivel mechanism of claim 6 wherein the first plate assembly has a wedge-shaped protrusion to frictionally engage the wedge in the cinched position to stabilize the swivel mechanism.

8. The swivel mechanism of claim 7 wherein actuation of the lock plate between the locked and the unlocked position slides the wedge from the cinched position to the uncinched position prior to the lock plate reaching the unlocked position disengaged from the lock pin.

9. The swivel mechanism of claim 8 wherein there is a gap between the lock plate and the wedge in the cinched position to prevent the lock plate from interfering with engagement of the wedge to the wedge-shaped protrusion.

10. The swivel mechanism of claim 9 further comprising a handle mechanism attached to the lock plate for actuating the lock plate between the locked and unlocked position.

11. The swivel mechanism of claim 10 further comprising a rolling-element bearing coupled between the first plate assembly and the second plate assembly to facilitate rotation of one of the first and second plate assemblies relative to the other of the first and second plate assemblies.

12. The swivel mechanism of claim 11 further comprising a first j-hook coupled to the first plate assembly and a second j-hook coupled to the second plate assembly, the first j-hook and the second j-hook operable to selectively interconnect for preventing separation of the first plate assembly and the second plate assembly.

13. The swivel mechanism of claim 12 wherein the lock plate includes a lock pin cutout to accept the lock pin when in the locked position.

14. The swivel mechanism of claim 13 wherein the projection slidably coupling the lock plate to the second plate assembly is a rivet.

15. The swivel mechanism of claim 14 wherein the lock plate spring includes a first end secured to a spring rivet projecting from the lock plate and a second end attached to the second plate assembly.

16. The swivel mechanism of claim 15 further comprising a handle bracket tab extending from the lock plate through a handle cutout in the second plate assembly to receive the handle mechanism.

17. The swivel mechanism of claim 16 wherein the wedge has a seating tab and a pair of feet for slidably securing the wedge to the longitudinal wedge cutout.

18. The swivel mechanism of claim 17 wherein the first plate assembly rotates relative to the second plate assembly.

19. The swivel mechanism of claim 17 wherein the second plate assembly rotates relative to the first plate assembly.

20. A seat assembly for supporting an occupant in an automotive vehicle, the seat assembly comprising:
a pair of lateral seat brackets;
a seat cushion coupled to the lateral seat brackets for supporting an occupant in the automotive vehicle;
a swivel mechanism coupled to the lateral seat brackets for providing rotation of the seat assembly, the swivel mechanism comprising: a first plate assembly coupled to a second plate assembly to facilitate axial rotation of one of the first and second plate assemblies relative to the other of the first and second plate assemblies, and a locking and stabilizing structure comprising a lock pin extending from the first plate assembly, a lock plate slidably coupled to the second plate assembly for movement between a locked position in which the lock plate is engaged with the lock pin to prevent rotation between the first plate assembly and the second plate assembly, and an unlocked position in which the lock plate is disengaged from the lock pin to allow rotation of one of the first and second plate assemblies relative to the other of the first and second plate assemblies, and a wedge slidably coupled to the second plate assembly for movement between a cinched position in which the wedge is frictionally engaged with the first plate assembly to stabilize the swivel mechanism, and an uncinched position disengaged from the first plate assembly to allow unimpeded rotation of one of the first and second plate assemblies relative to the other of the first and second plate assemblies; and
a seat back pivotally coupled to the lateral seat brackets for supporting the occupant in the automotive vehicle.

21. The seat assembly of claim 20 wherein actuation of the lock plate between the locked position and the unlocked position actuates movement of the wedge between the cinched position and the uncinched position.

22. The seat assembly of claim 21 further comprising a lock plate spring coupled between the lock plate and the second plate assembly to bias the lock plate to the locked position.

23. The seat assembly of claim 22 further comprising a wedge spring coupled between the wedge and the lock plate to bias the wedge to the cinched position.

24. The seat assembly of claim 23 wherein the lock plate includes a longitudinal projection cutout for receiving a projection therein extending from the second plate assembly to slidably couple the lock plate to the second plate assembly.

25. The seat assembly of claim 24 wherein the second plate assembly includes a longitudinal wedge cutout for slidably coupling the wedge to the second plate assembly.

26. The seat assembly of claim 25 wherein the first plate assembly has a wedge-shaped protrusion to frictionally engage the wedge in the cinched position to stabilize the swivel mechanism.

27. The seat assembly of claim 26 wherein actuation of the lock plate between the locked and the unlocked position slides the wedge from the cinched position to the uncinched position prior to the lock plate reaching the unlocked position disengaged from the lock pin.

28. The seat assembly of claim 27 wherein there is a gap between the lock plate and the wedge in the cinched position to prevent the lock plate from interfering with engagement of the wedge to the wedge-shaped protrusion.

29. The seat assembly of claim 28 further comprising a handle mechanism attached to the lock plate for actuating the lock plate between the locked and unlocked position.

30. The seat assembly of claim 29 further comprising a rolling-element bearing coupled between the first plate assembly and the second plate assembly to facilitate rotation of one of the first and second plate assemblies relative to the other of the first and second plate assemblies.

31. The seat assembly of claim 30 further comprising a first j-hook coupled to the first plate assembly and a second j-hook coupled to the second plate assembly, the first j-hook and the second j-hook operable to selectively interconnect for preventing separation of the first plate assembly and the second plate assembly.

32. The seat assembly of claim 31 wherein the lock plate includes a lock pin cutout to accept the lock pin when in the locked position.

33. The seat assembly of claim 32 wherein the projection slidably coupling the lock plate to the second plate assembly is a rivet.

34. The seat assembly of claim 33 wherein the lock plate spring includes a first end secured to a spring rivet projecting from the lock plate and a second end attached to the second plate assembly.

35. The seat assembly of claim 34 further comprising a handle bracket tab extending from the lock plate through a handle cutout in the second plate assembly to receive the handle mechanism.

36. The seat assembly of claim 35 wherein the wedge has a seating tab and a pair of feet for slidably securing the wedge to the longitudinal wedge cutout.

37. The seat assembly of claim 36 further comprising a lower riser structure coupled to the swivel mechanism for securing the seat assembly within the automotive vehicle.

38. The seat assembly of claim 37 wherein the first plate assembly rotates relative to the second plate assembly.

39. The seat assembly of claim 37 wherein the second plate assembly rotates relative to the first plate assembly.

* * * * *